Jan. 25, 1944.　　　D. E. MULHOLLAND　　　2,340,201
GLASS PROCESSING MACHINE
Filed July 17, 1942　　　4 Sheets-Sheet 1
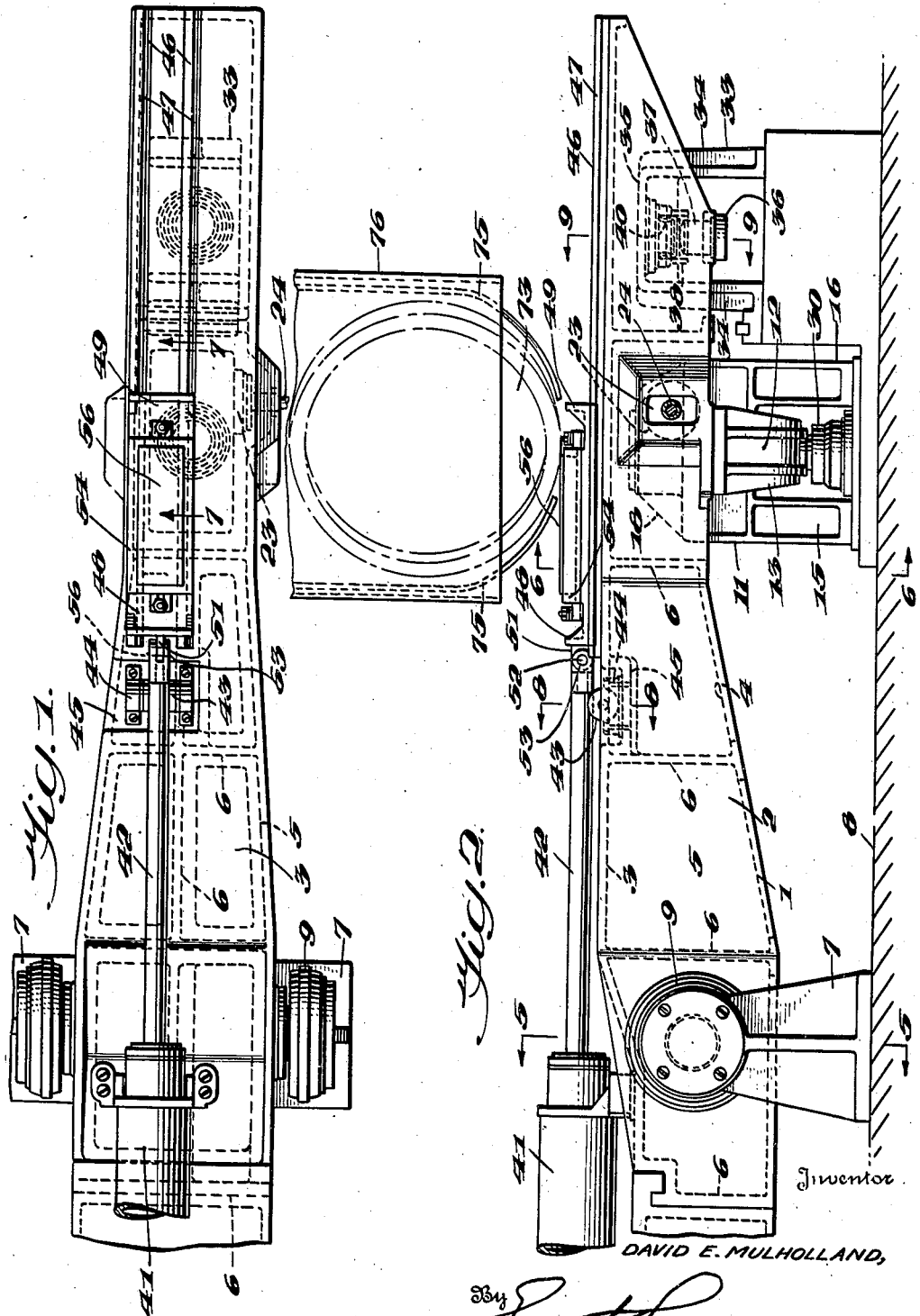
Inventor
DAVID E. MULHOLLAND,
By
Ernst F. Mechlin
His Attorney

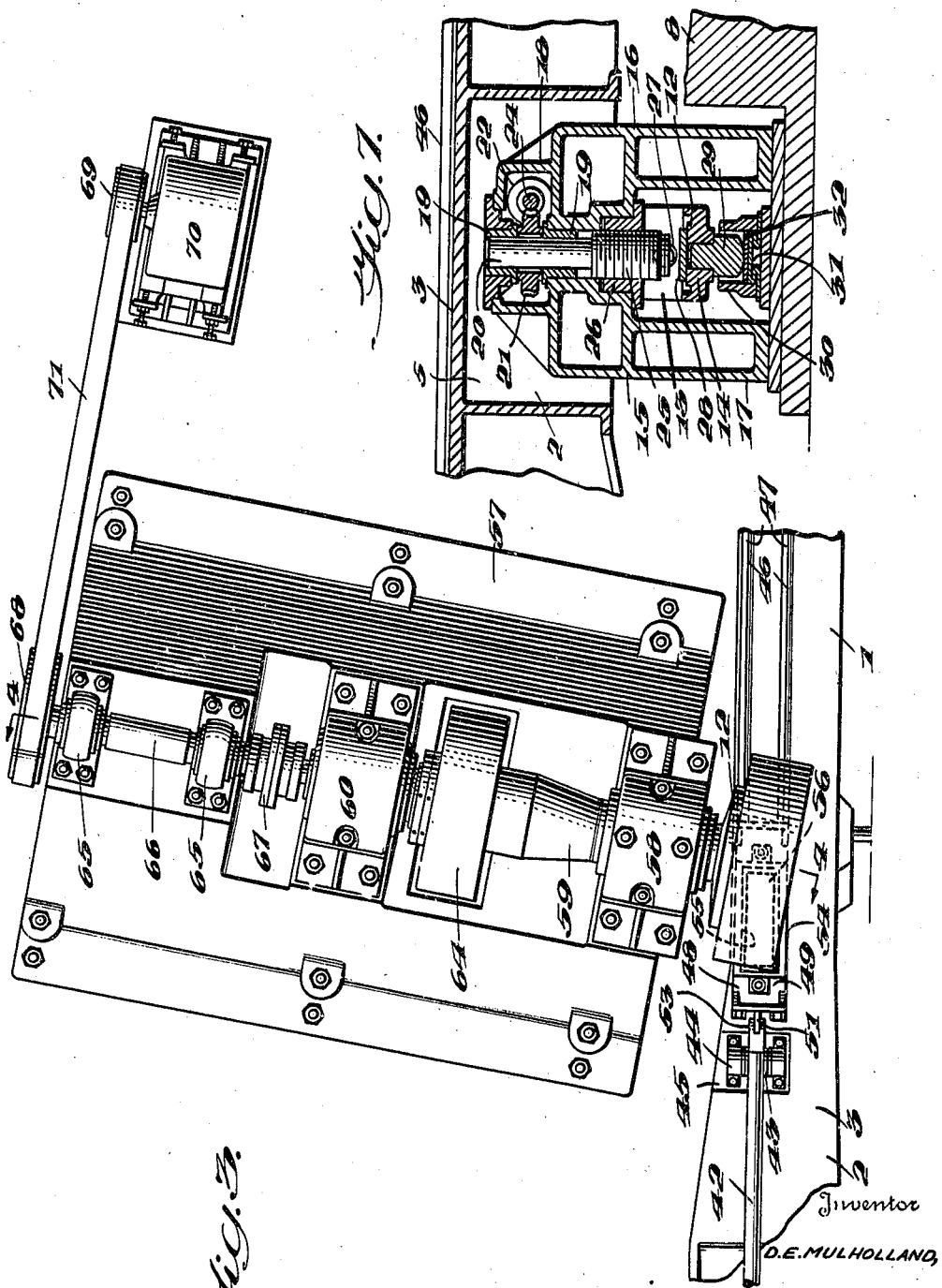

Jan. 25, 1944.　　D. E. MULHOLLAND　　2,340,201
GLASS PROCESSING MACHINE
Filed July 17, 1942　　4 Sheets-Sheet 3

Inventor
DAVID E. MULHOLLAND,
By
his Attorney

Jan. 25, 1944.   D. E. MULHOLLAND   2,340,201
GLASS PROCESSING MACHINE
Filed July 17, 1942    4 Sheets-Sheet 4
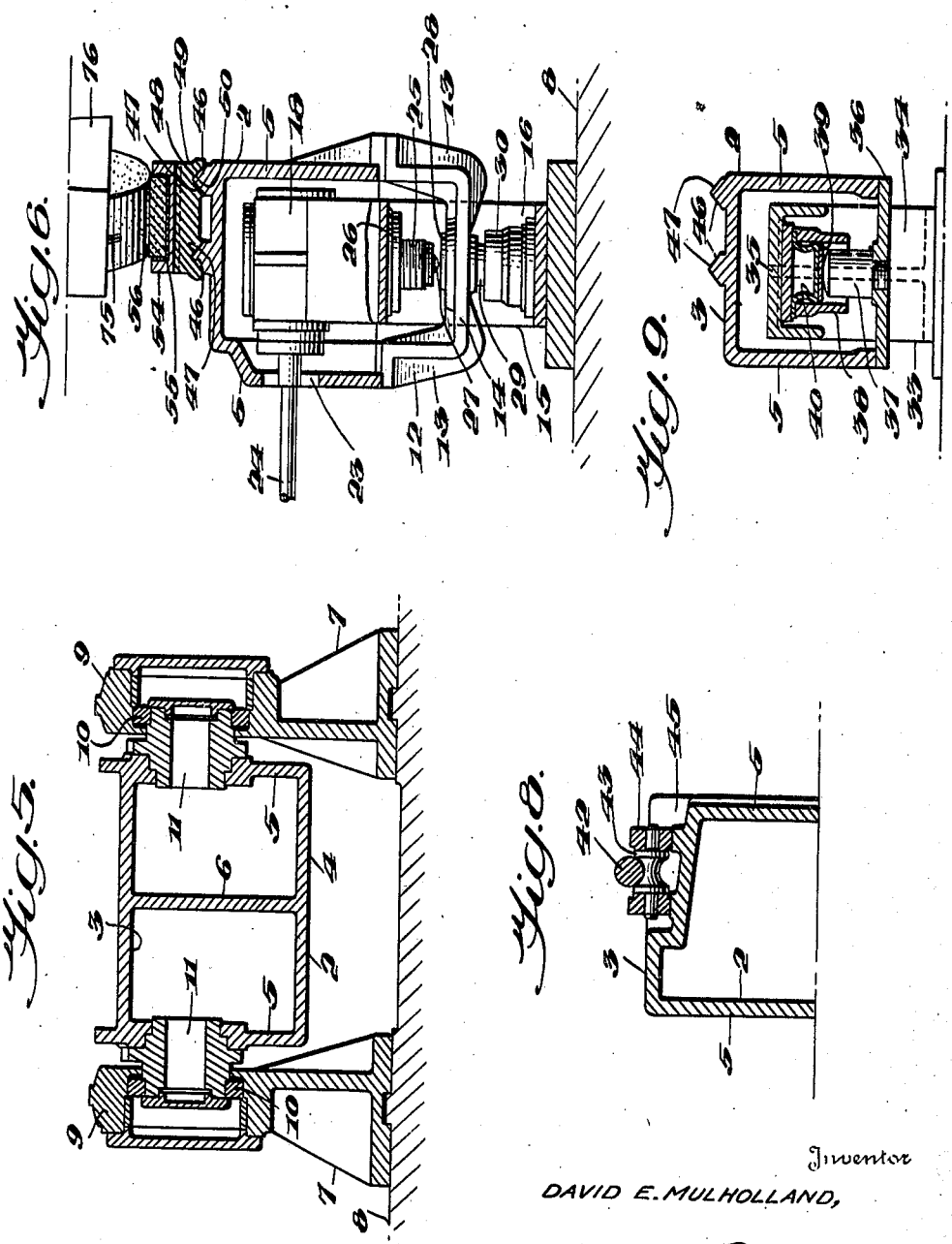
Inventor
DAVID E. MULHOLLAND, Patented Jan. 25, 1944

2,340,201

UNITED STATES PATENT OFFICE 2,340,201

GLASS PROCESSING MACHINE

David E. Mulholland, Fort Myers, Fla.

Application July 17, 1942, Serial No. 451,338

14 Claims. (Cl. 51—92)

The invention relates to a glass processing machine and more particularly to a mechanism adaptable for the processing of sheets of glass or prisms.

The primary object of the invention is to provide a machine for grinding or processing a plate or sheet of glass or a prism or prisms so that the plate or sheet of glass will have its opposite faces true, smooth and parallel, and the prism or prisms will have their related or relative faces or facets thereof true, smooth and disposed at a fixed predetermined angle.

Another object of the invention is the provision, in a glass processing machine, of a rigid member arranged to form a solid bed to carry the glass or prism to be processed with selectively controlled means for determining the pressure exerted on the glass or prism.

A further object of the invention is the provision, in a glass or prism processing machine, of a grinding or processing means maintained at a fixed elevation and a subjacent rigid beam pivotally mounted and selectively controlled and being arranged to urge glass or prisms carried by the beam upwardly against the grinding or processing means.

A still further object of the invention is to provide a rotatable grinding or processing means having an axis thereof disposed at an oblique angle relative to the direction of travel of a subjacent plate of glass or prism upon which the grinding or processing means is arranged to act.

An added object of the invention is the provision of a conduit means for directing a coolant at or adjacent the area of contact between the grinding or processing means and a plate of glass or prism.

An additional object of the invention is to provide, in a glass or prism processing machine, a pivotally mounted rigid member forming a carrier for a reciprocating glass or prism holding means arranged to move beneath a rotatable processing means and having horizontally spaced hydraulic means acting upon the rigid member to control or determine the pressure exerted upon the glass or prism.

These and numerous other objects of the invention will become apparent from the succeeding description considererd together with the accompanying drawings, the latter of which disclose, for the purpose of illustration, and not as a limitation, an exemplified form of the invention and wherein:

Figure 1 is a partial plan view of a glass or prism processing machine embodying a form of the present invention.

Figure 2 is a partial side elevational view of the glass or prism processing machine illustrated in Figure 1.

Figure 3 is a partial plan view of the glass or prism processing machine showing particularly a glass or prism processing means and a portion of the related structure.

Figure 5 is a transverse sectional view taken along the lines 5—5 of Figure 2, looking in the direction of the arrows.

Figure 6 is a transverse sectional view taken along the lines 6—6 of Figure 2, looking in the direction of the arrows.

Figure 7 is a vertical sectional view taken along the lines 7—7 of Figure 1, looking in the direction of the arrows.

Figure 8 is a transverse sectional view taken along the lines 8—8 of Figure 2, looking in the direction of the arrows.

Figure 9 is a transverse sectional view taken along the lines 9—9 of Figure 2, looking in the direction of the arrows.

Figure 4:
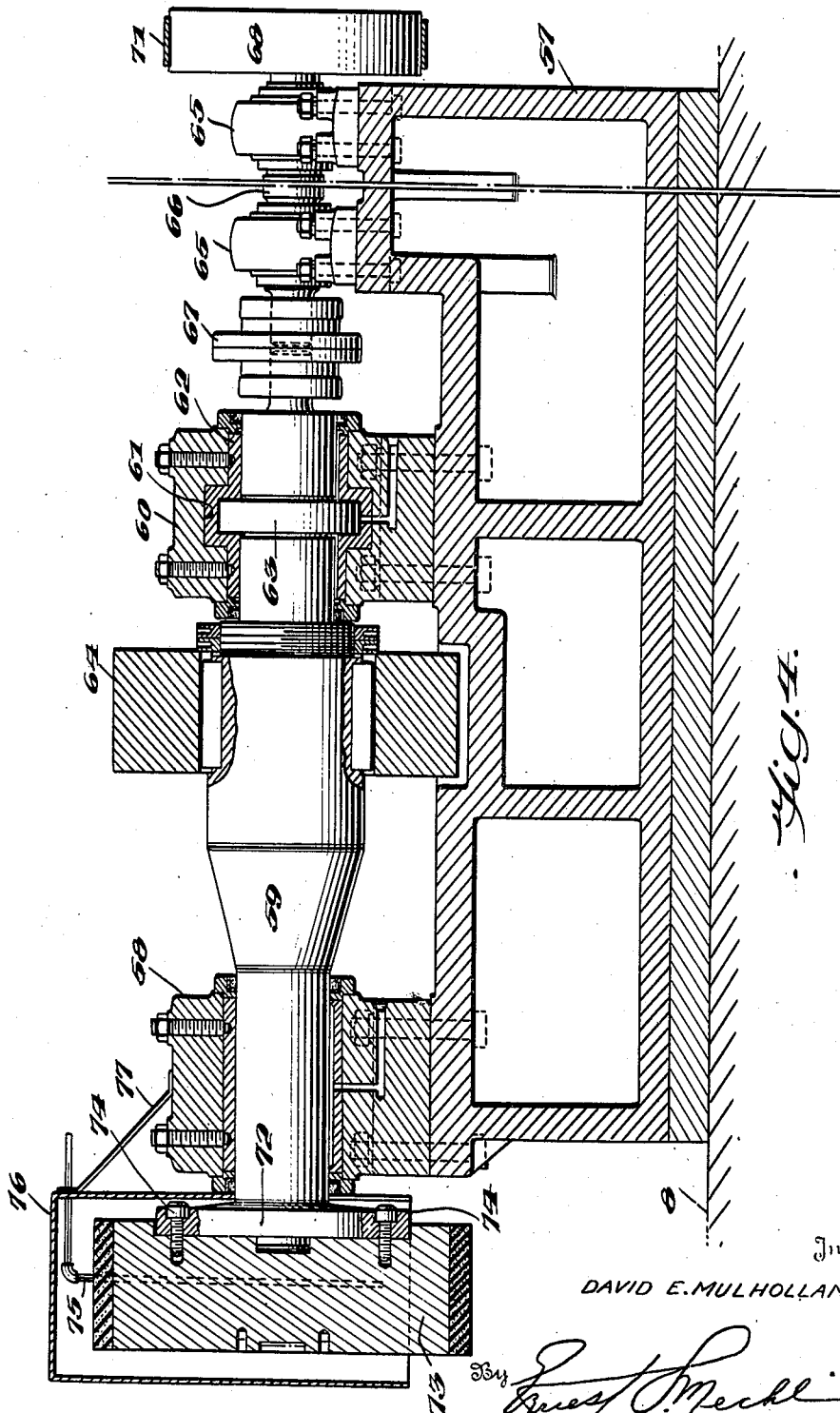
Figure 4 is a longitudinal sectional view of the glass or prism processing means and being taken along the lines 4—4 of Figure 3 looking in the direction of the arrows.

Referring now in detail to the drawings, wherein like reference characters indicate like parts, the numeral 1 is employed to designate in a somewhat general manner, a glass or prism grinding or processing machine embodying an exemplified form of the invention. In the processing of glass or prisms, in connection with the former, it sometimes becomes important and in connection with the latter imperative, that the faces thereof be ground and polished true and smooth and at a predetermined fixed relation to one another. The methods of forming glass plates or prisms known to me at the present writing are such that in the case of plates of glass, the two opposed surfaces are each continuously wavy or irregular with no portion of the two surfaces disposed in parallel planes. Likewise, in the case of prisms the methods of casting thereof are such that if used as cast without further processing, the prisms would have no or very slight commercial value because the faces or facets thereof are not true, nor are they disposed at a fixed predetermined angle relative to one another. By use of the present invention, as will be hereinafter pointed out in detail, plates of glass can be processed so that the opposing faces are true, smooth and parallel to one another and prisms will have their faces or facets true, smooth and properly related to one another.

The glass or prism processing machine of the present invention comprises a rigid or firm longitudinally extending beam or bed 2 formed by a continuous and substantially horizontally disposed top wall 3, a bottom wall 4 vertically spaced from and terminating short of the longitudinal limits of the top wall and transversely spaced, vertically extending side walls 5 joining the top and bottom walls. Ribbing or transverse and longitudinal webs 6 are properly and appropriately disposed between the respective walls to reinforce them against stresses to which they will be subjected in service. The beam or bed is preferably pivotally mounted intermediate its ends to vary the height or disposition thereof for the purpose to be hereinafter explained. As a form of pivotal connection which may be employed there is disclosed a pair of standards or bearing stands 7 each formed as counter-parts of one another and spaced transversely of the machine to be removably secured by any desired means (not shown) to a subjacent support, base or foundation 8. Each standard rises above the foundation to terminate at a predetermined elevation in a circular ring-like cage 9 having therein a fixed bushing or bearing 10. Stub axles 11 project in opposite directions transversely of the beam and are rigid therewith to extend into the cages and have their outer extremities formed so as to be neatly accommodated or received by the circumambient bushing or bearing rings 10. Accordingly, the beam or bed is arranged to pivot, move or rotate in a clockwise or counter-clockwise direction on or about the axis of the stub axles to render it, the beam or bed, adjustable.

On one end of the beam or bed or on the extremity to the left of the pivotal connection when considering Figure 2, an appropriate counter-balancing means (not shown) is provided to maintain the beam or bed in a degree of stabilization. Any desired counter-balancing means may be employed so long as the bed is properly counter-weighted or the weight of the beam to the right of the pivotal connection when considering Figure 2, is equalized or substantially so.

Control and adjusting means are associated with the portion of the bed overhanging to the right of the pivotal connection or away from the counter-balancing means to urge the beam in a rotative direction about the stub axles and also limit the amount of beam travel in one direction. As characteristic of such means, there is provided intermediate the pivotal connection and one end of the beam a U-shaped stirrup, saddle or cradle 12 depending from and firmly secured to the side walls 5 and comprising transversely spaced, vertical side legs 13 joined integrally at or adjacent their lower extremities by a horizontal web 14. Projecting upwardly from the foundation or base to a predetermined position within the limits of the beam, short of the top wall thereof, is a housing 15 formed of a base 16 secured to the foundation immediately beneath or in vertical alignment with the stirrup. Forming a part of the base 16 is a casing 17 in straddling relation with the stirrup or cradle and having a head portion 18 lying in the extended vertical plane of the saddle web. The casing head is provided with suitable vertically spaced and aligned bushings 19 which encircle a shaft 20, the latter of which is adapted to be rotated relative to the casing. Splined to the shaft in any suitable manner or method is a sprocket or gear 21 disposed horizontally and interposed between the spaced bushings 19. The gear is fixed to the shaft so as to impart a rotative motion thereto and arranged so that the shaft may slide or move in the direction of its axis so that while the gear and shaft may rotate as a unit, the latter may move vertically relative to the gear. A worm gear 22 disposed horizontally, is suitably journaled in the casing head and intermeshed with the gear 21. Outstanding from the worm gear through suitable apertures 23 in the casing head and an associated side wall of the bed is an operating shaft 24 which may, through the medium of any suitable crank or wheel (not shown) be rotated about its axis to impart a rotary motion to the sprocket and worm gear resulting in the lowering and raising of the shaft from its illustrated position. The lower portion of the shaft is outwardly threaded as at 25 and rotatably associated with a ferrule 26, the latter of which is swedged or otherwise retained in a predetermined fixed position within the casing head. The lowermost extremity of the shaft is provided with a ball or bearing 27 normally spaced from and arranged to be contacted by a bearing plate 28 carried by the saddle or cradle web; the distance between the ball and bearing plate being determinative of the permissible vertical or upward movement of the associated overhanging extremity of the beam or bed. The shaft and ball and their related actuating structure forms a limited stop means capable of being adjustable to control the upward movement of one end of the beam or bed for the purpose to be hereinafter explained.

Extending downwardly from and fixedly secured to the saddle web is a pendant 29 projecting into a cup-shaped receptacle 30, the latter of which is attached to the base 16. Disposed within the receptacle is a collapsible or expandable diaphragm 31 having mounted thereon a plate 32 which bears vertically against the pendant. The diaphragm houses a fluid of any nature and by reason of the presence of the fluid under pressure within the diaphragm a hydraulic means is formed to react vertically or upwardly against the pendant to move or urge the saddle and the associated end of the beam vertically or upwardly.

Positioned outwardly of the saddle and housing away from the pivotal connection and along the beam or bed is an inverted U-shaped strap 33 having horizontally spaced, vertically directed, upstanding arms 34 joined integrally adjacent their upper limits by a connecting plate 35. Intersecting the strap intermediate the height thereof is a bridge plate 36 horizontally disposed and removably secured to the depending side walls of the beam or bed, Projecting upwardly from the bridge plate and desirably threadedly associated therewith to render it removable is a plunger or stem 37 extending partially into a cup 38 fastened to the strap connecting plate and bearing against or in intimate contact with a cover 39. The cover forms a part of a fluid pressure or hydraulic means characterized by a collapsible or expandable diaphragm 40 containing a fluid of any nature. This arrangement, therefore, is designed or constructed so as to be selectively controlled by any method or means (not shown) to urge the associated extremity of the beam or bed in a downward or clockwise direction when considering Figure 2 of the drawings.

Movable means is associated with or carried by the beam or bed to move a sheet of glass or a prism or prisms along a predetermined, controlled and fixed path and as illustrative of such a means there is provided a cylinder 41 of which only a portion is shown in Figures 1 and 2 of the drawings. The cylinder is fixed with respect to the beam and has a piston 42 arranged to operate in a reciprocatory manner and extending substantially horizontally in substantial parallel spaced relation to the top wall 3 of the beam. Positioned outwardly of or at a predetermined distance from the cylinder is a spool-like guide roller 43 in guiding and supporting relationship with a free or associated extremity of the piston. The guide roller is retained in position through the medium of a bracket 44 which is secured to the top wall, the latter of which is, in the vicinity of the bracket, recessed or has an indenture 45 formed therein for the accommodation of the bracket. The beam has, extending along the top wall 3 thereof from adjacent the bracket to adjacent the extremity of the beam, a plurality, preferably a pair of transversely spaced parallel tracks, guideways or runners 46 extending longitudinally of and upstanding from the top wall. The tracks each desirably has an inverted V-shaped or wedge-shaped top surface 47 which need not be so limited but may, if desired, be of any configuration so long as it answers the purpose for which it is intended. Mounted upon and adapted to be moved along the tracks is a carriage or conveyor 48 comprising a shoe 49 having formed on a lower surface two parallel and transversely spaced recesses, cuts or reliefs 50 also of inverted V-shaped configuration to accommodate and receive the complementally formed track surfaces 47 so that the conveyor will be guided along a predetermined path. The surfaces 47 and 50 which are in intimate contact with one another are formed of inverted V-shaped so as to prevent a transverse movement of the carriage or conveyor as a result of service forces to which it will be subjected in service.

The shoe has extending from one end thereof a tongue or finger 51 pivotally or otherwise connected through the medium of a pin 52 to a clevis 53 formed as a part or extremity of the piston so that any reciprocatory motion imparted to the piston will be reflected in or transmitted to the conveyor or carriage. Mounted upon the conveyor in a removable or separable manner is a pan, receptacle or container 54 dish-like in formation. A convenient means for maintaining the glass within the pan is to deposit within or apply to the pan, a layer of plaster of Paris 55 into which is set a sheet of glass or a prism or plurality of prisms 56. The plaster of Paris, when applied to the container is in a liquid state, and the glass or prism is then embedded in the plaster of Paris whereupon the latter is permitted to harden or become solidified to thereby firmly retain the glass or prism within the pan.

A grinding or processing member is arranged with the beam and related structure and as exemplary of such a means there is provided in spaced relation to the vertical limits of the beam a superstructure casting 57 having mounted thereon adjacent one extremity a bearing 58 accommodating an associated extremity of a horizontally disposed axle or journal 59. Supporting the other extremity of the axle or journal is a suitable bearing 60 which is spaced horizontally from the bearing 58 and provided with a disk-like relief 61 accommodating a correspondingly formed portion of a liner 62. Outstanding radially from the axle intermediate the limits of the bearing 60 is a thrust collar 63 preferably formed integrally with the axle and disposed within the correspondingly formed portion of liner 61. The thrust collar is arranged to maintain the journal in a predetermined position and to overcome any thrusts or forces transmitted to or created in the journal axially thereof during service. Positioned on the journal intermediate the bearings 58 and 60 is a weight means or fly wheel 64 suitably keyed to the journal and arranged to impart a smooth or even running motion to the journal as well as overcome any back-lashing tendency of the journal in service. Spaced bearings 65 are secured to the superstructure casting in alignment with the journal to carry or accommodate an auxiliary journal or axle 66 which has one extremity thereof connected to an associated extremity of the journal through the medium of a flexible coupling 67 whereby a rotary motion is transmitted from the auxiliary axle to the journal. Suitably keyed or otherwise secured to the free extremity of the auxiliary axle is a pulley or wheel 68 which is flexibly connected to a drive wheel 69 of an electric motor 70 by means of a drive belt 71 and through which a rotary action or movement is imparted to the axle and auxiliary journal.

The extremity of the axle removed from the flexible connection is provided with a disk 72 to which is secured a drum 73 through the use of screws 74. The drum illustrated has its abrading surface formed of abrasive granules embedded in an organic bond and is designed to grind a surface or surfaces of a plate of glass, prism or prisms. The illustrated surface of the drum or roll may, if desired, be replaced by means having an outer surface formed by felting of the usual commercial form for finishing or polishing surfaces of the glass or prism to be processed.

It will be noted that the glass, prism or prisms are arranged by reason of the fixed movement of the supporting pan to move along a predetermined path longitudinally of the beam. Since in the process of grinding, the abrasive granules also move in a fixed path but in a circulatory manner the grinding or processing mechanism may be disposed at an angle to the beam so that the axis of the drum will be positioned at an oblique angle to the vertically extending plane of the path of travel of the carriage. By reason of this arrangement, therefore, the granules rotated about the axis of the drum and contacting the exposed surface of glass or prism will act upon the exposed surface at an oblique angle to the direction of movement of the glass and accordingly will prevent grooves, recesses or channels from being cut or formed in the glass or prism. It has been found in actual practice that the grinding effect of the abrasive roll is more efficient if the axis of the axles and of course the abrasive roll is disposed at an angle of approximately 18 degrees relative to a vertical plane perpendicular to or transversely of the movement of the glass or prism, but it is not the present intention to so limit the relationship of the axis of the abrasive roll and movement of the glass or prism.

By reverting to the portion of the hereinabove contained description of the hydraulic means it will be observed that by an actuation of the hydraulic means comprising the diaphragm 31 and associated structure, the related portion of the beam will be urged in a counter-clockwise direction resulting in the exposed surface of the glass or prism being urged into intimate contact with the processing roll and such action on the part of the beam will continue until the bearing plate 28 comes to rest against the ball 27 at which time a further or continued action of the beam will be arrested. Accordingly, the depth of the cut or amount of material removed from the glass or prism is determined by the gap or distance established between the ball 27 and the bearing plate. When the necessary amount of material has been removed from the glass or prism to effect a smooth, true surface, the hydraulic means causing the beam to move upwardly is de-energized and the hydraulic means characterized by the diaphragm 40 is actuated to impart a clockwise motion to the associated beam extremity and lower the glass or prism away from the roll 73.

A peculiar phenomenon has been discovered in conducting tests in connection with the machine forming the subject matter of this application. The amount of surface removed during a single pass beneath the abrading wheel when a given pressure was applied was not constant. In fact a wide variation was noticed. Whether this variation was due to the loading of the abrasive surface or to the impacting of the grains was impossible to determine even by a microscopic examination of the abrading surface. It was found, however, that by passing across the face of the wheel a high pressure jet or by applying at intervals a fan-shaped jet over the entire surface of the wheel—the pressure being measured in the pipe and being in the nature of 1600 pounds per square inch the rate of stock removed was substantially constant. The jet did not cause any wear upon the abrading surface that could be measured by the instrument at my disposal. It is of course to be understood that the jet or jets were in addition to and not as a substitute for the regular coolant means. I have further found that by another means I can accomplish the same or substantially the same result, that is by changing the rate of the pass beneath the wheel the rate of cut can be maintained substantially constant.

Accordingly, therefore, there is provided a jet 75 receiving a supply of coolant such as water from any desired source (not shown) and at each side of the roll 73 as illustrated particularly in Figures 2, 4 and 6; the coolant arrangement being removed from the remaining figures of the drawings to more clearly illustrate the other portions of the machine. The jets, which may be duplicated at each illustrated location if it is considered desirable or necessary, have their exit ports so disposed that the stream of coolant is emitted therefrom against the roll at an oblique angle or at an angle of less than 90 degrees to the surface of the roll or at an angle other than radial of the roll and may, if desired, be directed in a path tangential to the roll towards the line of contact between the roll and exposed surface of the glass or prism. So as to retain the coolant in a restricted area the roll is provided with an encasing hood or shield 76 housing the major portion of the roll and the coolant directing means and being supported from the bearing 58 through the medium of a brace 77.

From the above description of the exemplified form of the invention it will be observed that numerous changes and alterations may be made to the illustrated construction without departing from within the spirit of the invention and scope of the appended claims.

I claim:

1. In a prism grinding machine, the combination of, a balanced beam pivotally mounted intermediate its ends, reciprocal prism carrying means supported by one end of said beam, grinding means superimposed on said prism, said grinding means being disposed at an oblique angle to the direction of travel of said prism carrying means, a yoke depending from said beam, and the closed end of said yoke being spaced from said beam, means associated with said yoke end for limiting the pivotal movement of said beam toward said grinding means.

2. In a prism grinding machine, the combination of a balanced beam pivotally mounted intermediate its ends, reciprocable prism carrying means mounted on one end of said beam, grinding means arranged above said prism carrying means, said grinding means being disposed at an oblique angle to the direction of travel of said prism carrying means, a U-shaped yoke depending from said beam, means fixedly mounted beneath said beam having an adjustable stop member for cooperating with said yoke to limit pivotal movement of the beam in a direction causing said prism carrying means to move toward said grinding means, and hydraulic means associated with said beam adjacent said yoke and spaced from the pivotal connection of said beam for moving the beam about its pivot in said direction.

3. In a glass processing machine, the combination of a balanced beam pivotally mounted intermediate its ends, glass holding means movable in a predetermined path carried by one end of said beam, rotatable glass processing means arranged to act upon a surface of said glass, actuating means for moving said beam about its pivotal axis to cause said glass holding means to move toward the glass processing means, a yoke formed on said balanced beam, and adjustable means mounted beneath said beam independently thereof for cooperating with said yoke to limit movement of said beam by said actuating means.

4. In a glass processing machine, the combination of, a vertically adjustable balanced beam, glass holding means reciprocally movable and mounted on said beam, rotatable glass processing means arranged to act upon said glass and having an axis disposed at an oblique angle to the direction of movement of said glass holding means, yoke means formed on said beam, stop means arranged to be contacted by said yoke means, and means in alignment with said stop means for urging said yoke means toward said stop means.

5. In a glass processing machine, the combination of, a vertically adjustable beam, glass holding means reciprocally movable and mounted on said beam, rotatable glass processing means arranged to act upon said glass, depending yoke means formed on said beam, adjustable stop means within said beam arranged to be contacted by said yoke means for limiting movement of said beam in one direction.

6. In a prism grinding machine, the combination of, a pivotally supported balanced beam, a guideway on said beam, prism holding means associated with said guideway, reciprocal means carried by said beam for moving said prism holding means along said beam, yoke means formed on said beam, adjustable stop means within said beam and disposed in the path of said yoke means, spaced selectively controlled means for determining the position of said beam relative to a horizontal plane, one of said selectively controlled means arranged to react against said yoke means, and rotatable grinding means including a drum having bonded abrasives arranged to act on said prism; said rotatable grinding means being spaced from the pivot of said beam and having an axis at an angle to a vertical plane perpendicular to the direction of travel of said glass holding means.

7. In a prism grinding machine, the combination of a pivotally supported balanced beam, a guideway mounted on one end of said beam, prism holding means associated with said guideway, reciprocal means carried by said beam for moving said prism holding means along said beam, spaced selectively controlled means for respectively rotating said beam in opposite directions, an adjustable stop member beneath said beam, a member rigid with said beam for cooperating with said stop member to limit pivotal movement of said beam in one direction, rotatable grinding means including a drum mounted above and independently of said beam, said drum having bonded abrasives arranged to act on said prism, said rotatable grinding means being spaced from the pivot of said beam and having an axis at an angle to a vertical plane perpendicular to the direction of travel of said prism holding means, and means for directing a coolant to the area of the prism affected by said grinding means.

8. In a prism grinding machine, the combination of a rigid balanced member pivotally mounted intermediate its ends, guide means on said rigid member, a prism holding pan mounted on said guide means, reciprocating means connected to said pan for moving the latter along said guide means, horizontally spaced selectively operable means mounted beneath one end of said member for respectively moving it in opposite directions, an adjustable stop member positioned beneath said rigid member, means rigid with said rigid member having a portion arranged below said stop member for cooperating therewith to limit movement of said beam in one direction, rotatable grinding means arranged to act on the upper surface of a prism carried by said pan, said rotatable grinding means being disposed at a fixed elevation, and means for directing a coolant at the area of contact between the rotatable grinding means and prism.

9. In a prism grinding machine, the combination of, a pivoted rigid balanced member, means spaced from the pivot of said rigid member for tilting the latter upwardly, adjustable stop means within said member for limiting the upward movement of said rigid member, means spaced from said first named means for tilting said rigid member downwardly, guide means carried by said rigid member, a prism carrying reciprocating pan associated with said guide means, said reciprocating pan being prevented from shifting transversely of said rigid member by said guide means, and rotating grinding means arranged to act on said prism and having an axis thereof disposed at an oblique angle to the direction of movement of said prism carrying reciprocating pan.

10. In a glass processing machine, the combination of a beam pivotally mounted intermediate its ends, movable glass holding means mounted on said beam in spaced relation to the pivotal axis thereof, rotatable glass processing means mounted above said glass holding means, fluid pressure means for moving said beam about its pivot to cause said glass holding means to move toward said glass processing means, a U-shaped member rigid with said beam and depending therefrom, and means fixedly mounted beneath said beam and straddling said U-shaped member, said fixedly mounted means having a vertically adjustable member cooperable with said U-shaped member for limiting movement of said beam by said fluid pressure means.

11. In a glass processing machine, the combination of a beam pivotally mounted intermediate its ends, movable glass holding means mounted on said beam in spaced relation to the pivotal axis thereof, rotatable glass processing means mounted above said glass holding means, fluid pressure means for moving said beam about its pivot to cause said glass holding means to move toward said glass processing means, means fixedly mounted beneath said beam having a downwardly extending vertically adjustable stop member, and means rigid with said beam having a portion extending beneath said stop member for cooperating therewith to limit movement of said beam by said fluid pressure means.

12. In a glass processing machine, the combination of a beam pivotally mounted intermediate its ends, movable glass holding means mounted on said beam in spaced relation to the pivotal axis thereof, rotatable glass processing means mounted above said glass holding means, fluid pressure means for moving said beam about its pivot to cause said glass holding means to move toward said glass processing means, a member rigid with and depending from said beam having a portion spaced downwardly therefrom affording an abutment, and means fixedly mounted beneath said beam including a vertically adjustable rotatable member cooperable with the upper face of said abutment for limiting movement of said beam by said fluid pressure means.

13. In a glass processing machine, the combination of a beam pivotally mounted intermediate its ends, movable glass holding means mounted on said beam in spaced relation to the pivotal axis thereof, rotatable glass processing means mounted above said glass holding means, fluid pressure means for moving said beam about its pivot to cause said glass holding means to move toward said glass processing means, a yoke rigid with the beam and depending therefrom, means fixedly mounted beneath said beam and straddling said yoke, said fixedly mounted means being provided with vertically adjustable means arranged within said yoke and cooperable therewith for limiting movement of the beam by said fluid pressure operated means, and additional means fixedly mounted beneath said beam having downwardly acting fluid pressure operated means for pivoting said beam in a direction to cause the glass holding means to move away from said glass processing means.

14. In a glass processing machine, the combination of a beam pivotally mounted intermediate its ends, reciprocal glass holding means carried by said beam, glass processing means mounted above said glass holding means and independently of said beam, an adjustable stop member positioned beneath said beam, a member rigid with said beam adapted to cooperate with said stop member for limiting movement of one end of said beam in one direction, and pressure means cooperable with said beam for moving it in the direction in which it will cooperate with said stop member.

DAVID E. MULHOLLAND.